United States Patent [19]
Zimmer

[11] Patent Number: 6,082,926
[45] Date of Patent: Jul. 4, 2000

[54] ENERGY ABSORBANT MODULE

[75] Inventor: Richard A. Zimmer, College Station, Tex.

[73] Assignee: Texas A&M University System, College Station, Tex.

[21] Appl. No.: 09/123,309

[22] Filed: Jul. 28, 1998

[51] Int. Cl.$^7$ ..................................................... E01F 9/018
[52] U.S. Cl. ..................................................... 404/6; 404/9
[58] Field of Search .................... 404/6, 9; 52/736.3, 52/737.4, 738.1, 730.1

[56] References Cited

U.S. PATENT DOCUMENTS

| | | | |
|---|---|---|---|
| 3,666,055 | 5/1972 | Walker et al. | 188/1 |
| 3,856,268 | 12/1974 | Fitch | 256/13.1 |
| 3,944,187 | 3/1976 | Walker | 256/13.1 |
| 5,192,157 | 3/1993 | Laturner | 404/6 |
| 5,246,514 | 9/1993 | Alderman et al. | 156/73.1 |
| 5,286,137 | 2/1994 | Cicinnati et al. | 404/6 |
| 5,391,016 | 2/1995 | Ivey et al. | 404/6 |
| 5,779,389 | 7/1998 | Niemerski | 404/6 |

FOREIGN PATENT DOCUMENTS

| | | |
|---|---|---|
| 0517377A | 12/1992 | European Pat. Off. . |
| 0652388A | 5/1995 | European Pat. Off. . |
| 2334121A | 2/1975 | Germany . |
| 1341820A | 12/1973 | United Kingdom . |
| 1489065 | 5/1975 | United Kingdom ............ F16F 7/12 |
| 1489065A | 10/1977 | United Kingdom . |
| WO8604028A | 7/1986 | WIPO . |
| WO9712095A | 4/1997 | WIPO . |

*Primary Examiner*—Eileen Dunn Lillis
*Assistant Examiner*—Raymond Addie
*Attorney, Agent, or Firm*—Frank S. Vaden, III; Shawn Hunter; Felsman, Bradley, Vaden, Gunter & Dillon, LLP

[57] ABSTRACT

A novel energy absorbing module is described which is relatively inexpensive, easy to make and provides for a relatively consistent crush resistance along its length when impacted axially. The module is made up of a generally cylindrical metal member which is formed from a roll of sheet metal that is wound into a tube having a spiral cross-section. A layer of spacer material, such as polyethylene foam, is placed adjacent the sheet metal so that the winds of the spiral are separated from one another. The energy absorbent module of the present invention provides a relatively constant and predictable level of crush resistance which makes it particularly suitable for such applications as an insert for a guardrail end treatment or other crash barrier. The module is formed by rolling a sheet of metal, or similar material, and the spacer sheet into a tubular or cylindrical form. A portion of one end of the module is then crushed slightly by impact loading. A binder may be applied to maintain the module in its cylindrical shape.

In one exemplary embodiment, the module is used as an insert within barrels which are placed within a frame to provide a guardrail end treatment and used to dissipate energy from a collision in a controlled fashion. In another exemplary application, a module is used as a replaceable insert for a telescoping tube guardrail end treatment. The use of the module of the present invention in this application permits a relatively constant crush resistance to be created as the end treatment collapses telescopically.

15 Claims, 4 Drawing Sheets

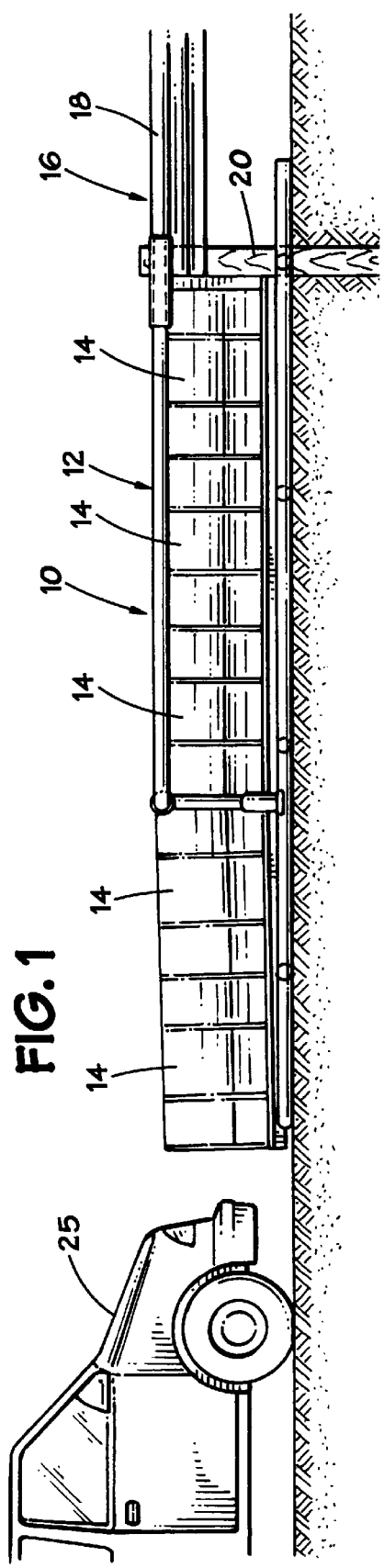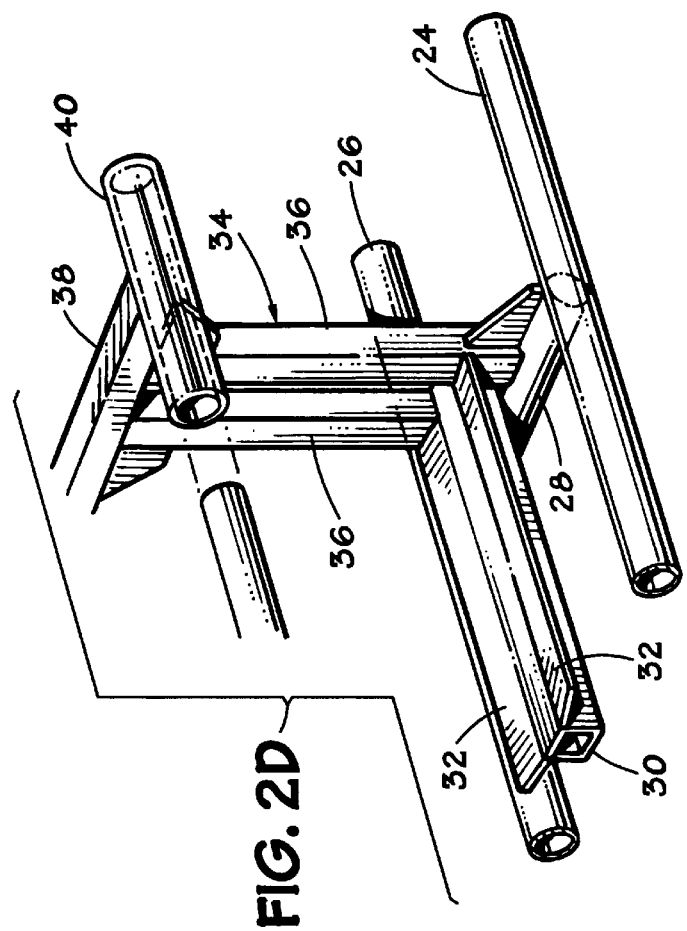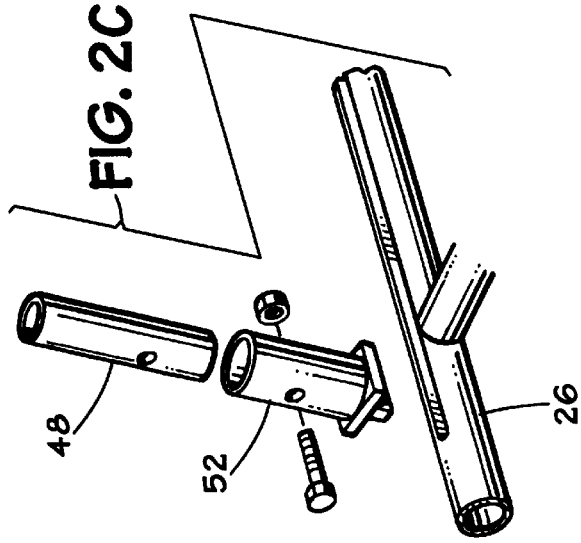

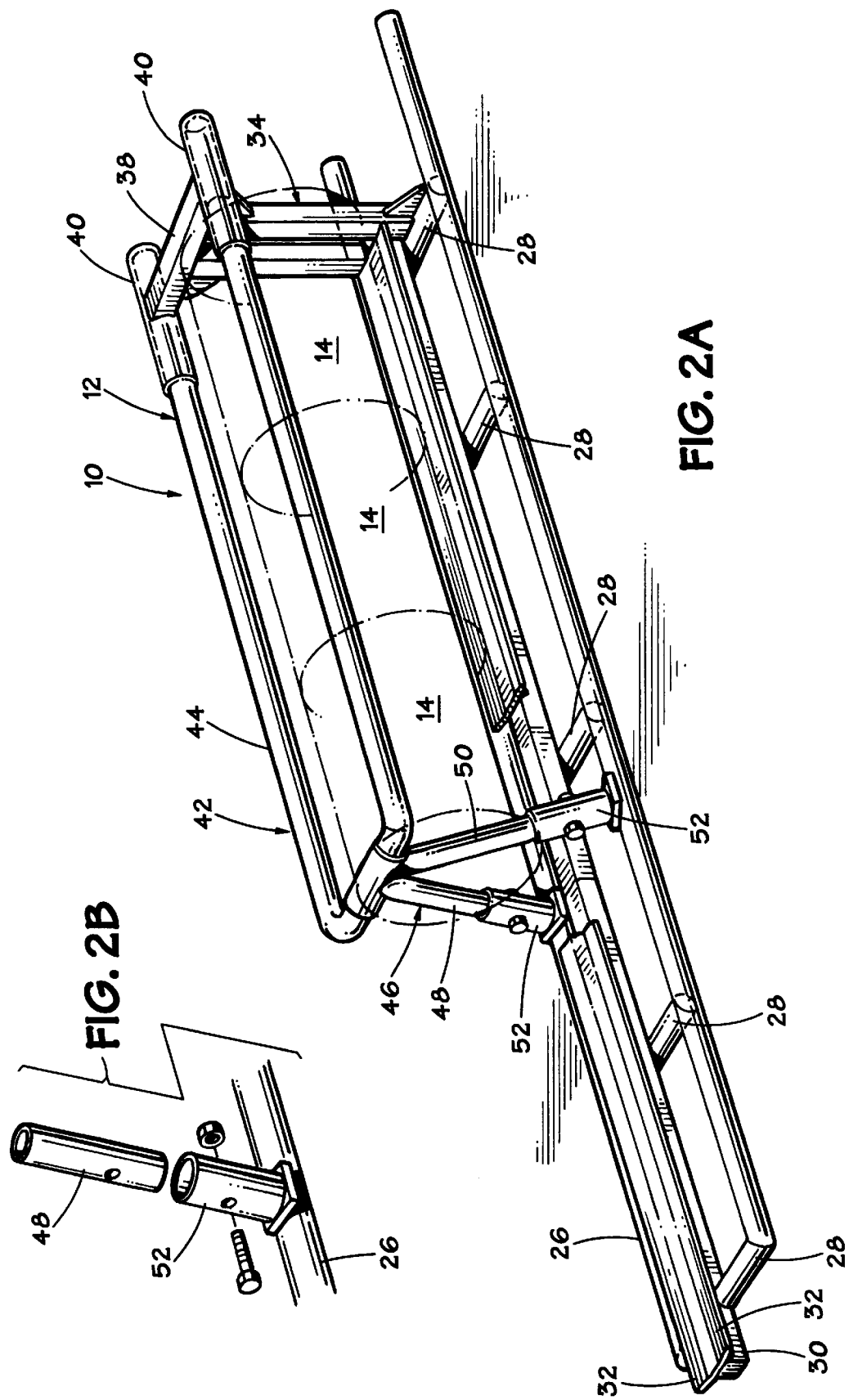

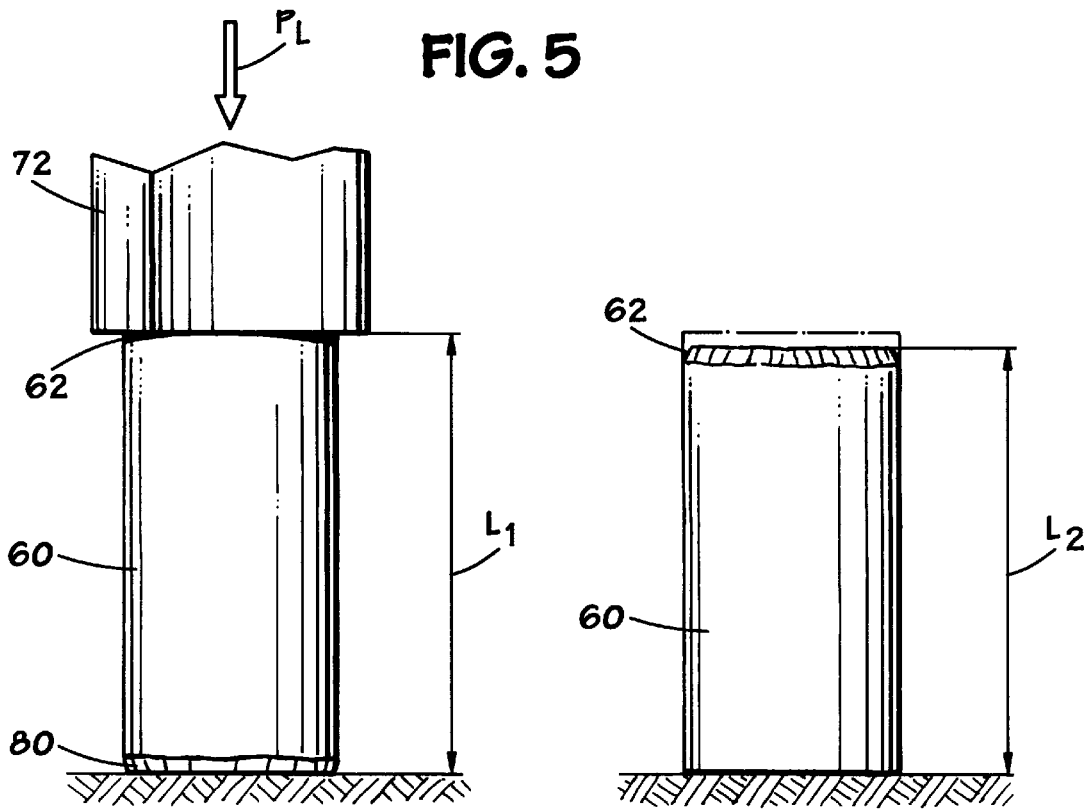
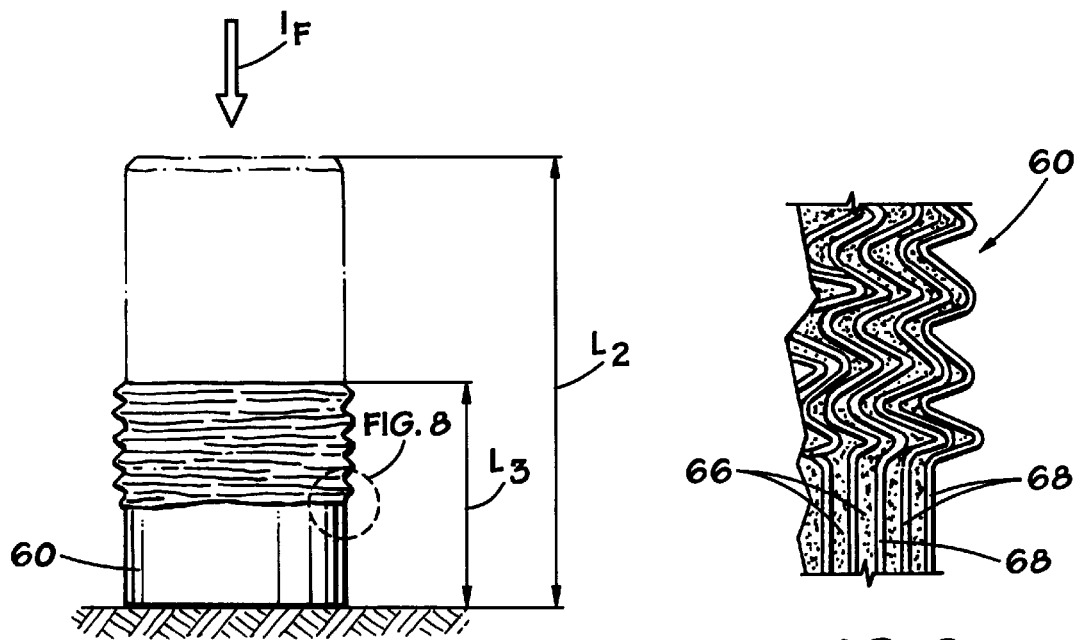

ENERGY ABSORBANT MODULE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to fabricated energy absorbing members and inserts and the methods for making them. In a preferred embodiment, the invention describes a module which is useful for absorbing energy during a vehicular crash and thus is used as an energy absorbent insert for certain highway crash cushions.

2. Description of the Related Art

Numerous materials are known which are used in crash barriers or vehicle collision absorption systems for the absorption or dissipation of energy from vehicle collisions. These materials are usually small, items or materials, such as Styrofoam peanuts, sand and other forms of packing, which can be placed into a compartment or chamber to be crushed or displaced. Unfortunately, the use of currently available fillers sometimes causes non-uniform resistances to crushing. These non-uniform results are usually due to variances in packing procedures, manufacturing procedures, or variances in the amount and types of fillers used.

Some prefabricated objects are known which provide a member of relatively fixed size and crush resistance. An example is the prefabricated plastic barrels currently used for roadwork.

Some devices, however, require smaller prefabricated inserts which can be replaced after use. Examples of such devices are guardrail end treatments described in further detail in U.S. Pat. No. 5,391,016, entitled "Metal Beam Rail Terminal" issued to Ivey et al. and assigned to the assignee of the present invention. That patent is hereby incorporated by reference. These telescoping tube-type devices, in general, use two or more longitudinal segments which are nested within one another so that one of the segments is telescopically received within the other in response to an impact at the axial end of the device. Currently, prefabricated plastic rods or cylinders are purchased and used to provide a crushable filler or insert that is placed within the larger segment and crushed by telescopic movement of the smaller segment. It is intended that the plastic rod will crush along its length as the collision progresses, thus providing a relatively uniform and constant resistance throughout the duration of the impact and dissipating the crash energy in a controlled manner. Unfortunately, it is usually necessary to modify the plastic rods, as described in U.S. Pat. No. 5,391,016 by placing notches in the ends and then placing end caps over the ends in order to make them crush more easily. This means tools and extra components are needed to so modify the plastic rods. Further, the plastic rods are subject to manufacturing defects and variances which may affect their crush resistance. In extreme cold, the plastic becomes brittle and may tend to shatter all at once rather than be crushed along its length. In this case, the energy of the collision is not dissipated in a controlled fashion.

It would be desirable, then to have a prefabricated insert which requires no additional components, produces reliably consistent crush resistances along its length over a range of temperatures and is easy and inexpensive to produce. The present invention addresses the problems inherent in the prior art.

SUMMARY OF THE INVENTION

The present invention describes a novel energy absorbing module which is relatively inexpensive and easy to make and which provides for a relatively consistent crush resistance along its length when impacted axially. The module is made up of a generally cylindrical structural member which may be formed from a roll of sheet material that is wound into a tube having a spiral cross-section. A sheet of spacer material, such as polyethylene foam, is placed adjacent the sheet metal so that the winds of the spiral are separated from one another. Alternatively, a bonding material may be applied to one or more ends of the wound cylinder to maintain a constant space between the winds of the spiral.

The energy absorbent module of the present invention provides a relatively constant and predictable level of crush resistance which makes it particularly suitable for such applications as an insert for a guardrail end treatment or other crash barrier.

The module is formed by rolling a thin sheet of metal, or similar material, and spacer sheet, if used, into a tubular or cylindrical form. A portion of one end of the module is then crushed or bent slightly by impact loading to eliminate any high initial forces during actual use. A binder may be applied to maintain the module in its cylindrical shape.

In one exemplary embodiment, the module is used as an insert within barrels which are placed within a frame to provide a guardrail end treatment and used to dissipate energy from a collision in a controlled fashion.

In another exemplary application, a module is used as a replaceable insert for a telescoping tube guardrail end treatment. The use of the module of the present invention in this application permits a relatively constant crush resistance to be created as the end treatment collapses telescopically.

The invention also describes a collapsible guardrail end treatment formed by a frame which contains a number of axially disposed barrels, each of which contains crushable modules. The frame further features a slidable guide or guides which constrains the barrels and provides additional strength to the assembly during an impact that does not proceed directly along the longitudinal axis of the barrels.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein:

FIG. 1 is a side view of an exemplary guardrail end treatment which incorporates the crushable module of the present invention.

FIG. 2A is an isometric view of the end treatment depicted in FIG. 1.

FIGS. 2B and 2C are details depicting attachment of the upper and lower portions of the frame for the end treatment.

FIG. 2D depicts the rear wall portion of the frame of the end treatment of FIG. 1.

FIGS. 5 and 6 illustrate precrushing of an end portion of a module.

FIGS. 7 and 8 depict a module after having been crushed along substantially all of its useful length.

DETAILED DESCRIPTION OF THE PREFERRED EMBODIMENTS

Figures 3, 4:
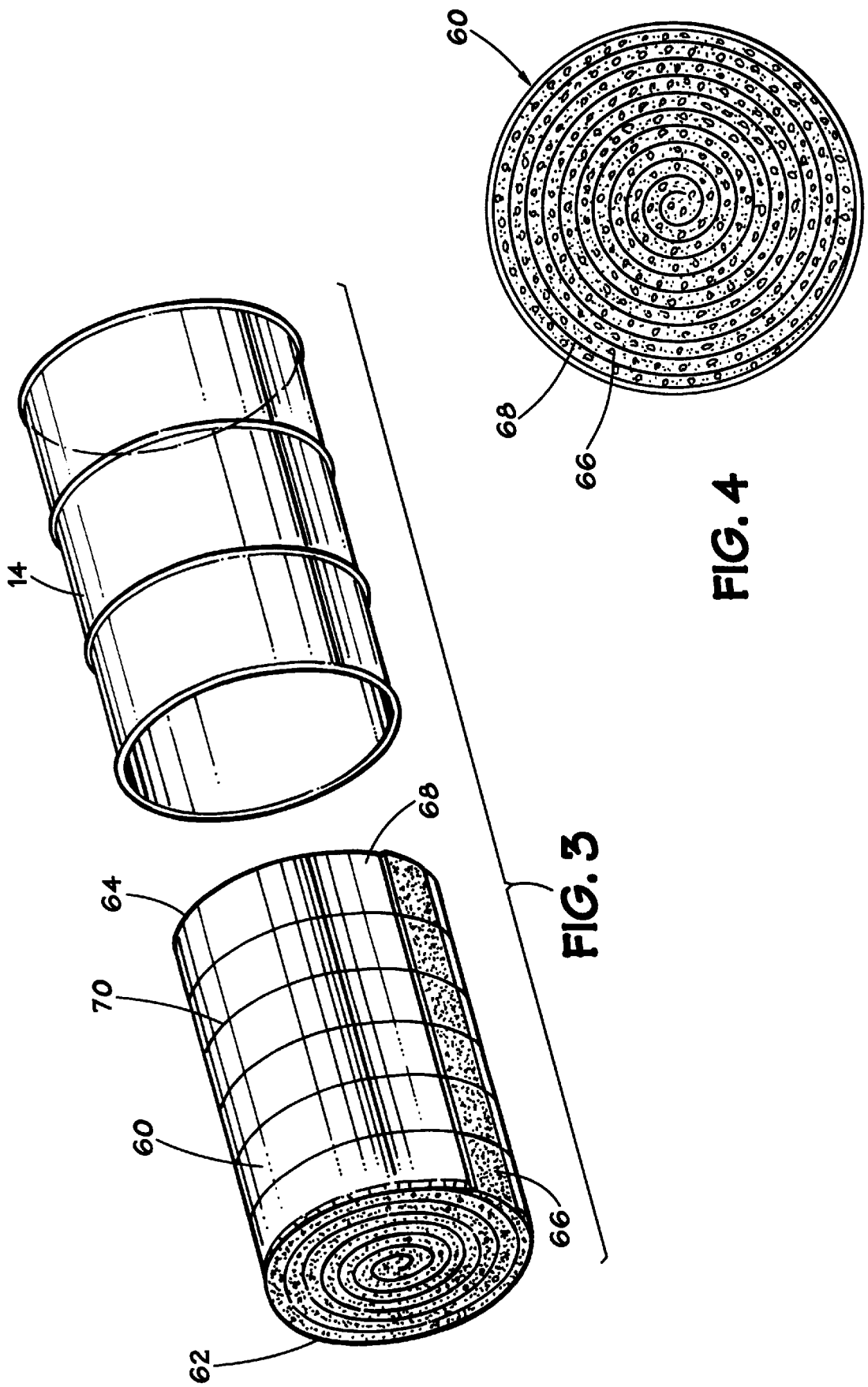
FIG. 3 is an exploded view showing an exemplary crushable module which is used within a barrel with the end treatment shown in the previous drawings.
FIG. 4 is an end view of the module of FIG. 3.

FIGS. 1 and 2A–2D depict an guardrail end treatment 10 which is made up of a tubular frame 12 and several axially disposed barrels 14 which are placed therein. The end treatment 10 is an exemplary device which might incorporate the crushable module as described in the present invention. The guardrail treatment 10 is shown in FIG. 1 to be affixed to or located adjacent a guardrail assembly 16 of a type which is well known and in place along most roadways. The guardrail assembly 16 includes a corrugated, horizontal rail 18 and a support post 20. A car 25 is shown in FIG. 1 approaching the guardrail end treatment 10 from an upstream end.

The frame 12 is preferably formed of steel or metal components which are welded to one another, although other means of affixing the components may be used. The end treatment 10 is adapted to collapse in a controlled manner when impacted from the upstream end, thus dissipating the impact energy of such an impact. A relatively uniform dissipation of energy during collapse is desirable to prevent the car from impacting the upraised end of the corrugated rail 18 and prevent an unnecessarily jarring stop for the vehicle.

Construction of the frame 12 is shown in greater detail in FIGS. 2A–2D. The frame consists of a base 22 made up of a pair of longitudinal members 24, 26 and several cross pieces 28. A centrally-located box beam 30 runs the length of the base 22 disposed across the cross pieces 28. A pair of wings or flanges 32 extend outwardly from the box beam 30. The base 22 includes a rear, vertically-oriented wall 34, best depicted in FIG. 2D, which is formed by a number of vertically-disposed box beam members 36 and a horizontally-disposed box beam member 38. A pair of tubular sleeves 40 are affixed at either end of the horizontal member 38. The rear wall 34 serves to brace the barrels 14 of the end treatment 10 when the barrels 14 are disposed along the central box beam 30 and flanges 32 of the base 22.

A slidable guide 42 mates with the base 22 to help retain some of the barrels 14 on the base 22. The guide 42 includes a top bracket 44 which is generally U-shaped with the legs of the "U" disposed through each of the sleeves 40 on the rear wall 34 in a nesting relation. A front support 46 (best shown in FIG. 2A) is secured to the central portion of the "U" of the bracket 44. As FIG. 1 shows, the front support 46 is actually disposed between two of the barrels 14 rather than positioned in front of all of them. The front support 46 includes a pair of downwardly depending legs 48, 50 with wear shoes or shanks 52 bolted to their lower ends (See FIGS. 2B and 2C). The guide 42 functions to help retain some the barrels 14 in place on the base 22 of the frame 12. It also slides along the base 22 in a telescopic manner during an impact due to the nesting relation of the bracket 44 and the sleeves 40. The barrels 14 are crushed axially by the impact, and the guide 42 moves downstream as the collision progresses. Preferably, holes (not shown) are drilled near one end of the barrels 14 so that air within the barrels 14 can escape during a vehicular impact, thus permitting the barrels 14 to crush more readily. Preferably, as well, the holes are covered with a moisture resistant tape to prevent moisture, insects, and other contaminants from entering the barrels 14.

FIGS. 3 and 4 illustrate a large, barrel-type crushable module, constructed in accordance with the present invention, which is used within one or more of the barrels 14 shown in FIGS. 1 and 2A. Module 60 is shown which is constructed from a pair of materials: a stronger, structural material, such as a sheet of metal of a strength and thickness to produce a desired crush force; and a weaker, non-structural spacer material, such as polyethylene foam. The module 60 is generally cylindrical in shape and extends longitudinally along an axis (x—x). The module 60 has two axial ends 62, 64. The module should be appropriately sized to fit within the confines of the barrel 14. The module 60 is formed by overlaying a layer of spacer material 66 onto a sheet of structural material 68. In one preferred embodiment, the layer of spacer material 66 comprises a sheet of polyethylene foam with a thickness between 1/8" and 1/4". The sheet of structural material 68 comprises a metal sheet which may be 0.01" to 0.03" thick aluminum or 22 to 30 gauge galvanized steel.

After the layer 66 is overlaid upon the structural sheet 68, the two are then wound into a composite cylinder in such a manner that the layer and sheet 66, 68 form the spiral-shaped cross-section depicted in FIG. 2. As shown there, the winds or folds of the structural sheet 68 are separated by the spacer layer 66.

Once the rolling operation is completed, a binder is applied to maintain the module 10 in its cylindrical shape. The currently preferred binder is a galvanized steel wire 70 of suitable thickness, such as 18 to 12 gauge. The wire 70 is attached to one axial end 62 of the module 60 and then wound in a spiral fashion around the module 60 along its length to the opposite axial end 64. The wire 70 is affixed to the ends 62, 64 by securing it through small holes (not shown) which are placed into the sheet metal. This affixation is normally done prior to the precrush step explained below. Other suitable binders may be used to secure or maintain the module 60 in a generally cylindrical shape including straps, glues and so forth. It is pointed out that for larger modules, such as those used inside barrels 14, the use of a wire binder may be omitted. Further, the use of physical spacer material 66 may be eliminated so that the spacer material between the winds of the sheet 66 comprises an air space (see FIG. 8). It is further noted that with smaller modules of reduced diameter, glue or other bonding may be applied to one or more ends of the module so that the bonding becomes disposed between the winds of the structural sheet 66 and retains the winds in a fixed relation from one another. FIG. 5 depicts such bonding 80 at the lower end of an exemplary module 60.

One axial end 62 of the module 60 is then precrushed to create an initial weakness in the structure of the module 60 at a desired position. FIG. 4 illustrates one method of creating the precrushed portion of the axial end 62. As depicted in FIG. 5, the module 60 is placed into a press and an impacting member 72 is lowered onto the axial end 62 so that a precrushing load ($P_L$) is applied to the end 62 crushing a portion of it. If desired, portions of the end 62 may be crimped using a crimper prior to precrushing so that only the desired portion of the module 60 is crushed during the precrushing step. It is preferred that approximately one inch or so of the module 60 be precrushed in this manner. During axial precrushing or axial crushing of the module 10, the structural sheet 68 deforms along the length of the module

60 such that the initial length ("$L_1$") of the module 60 is reduced to a precrushed length ("$L_2$"). Following a vehicular impact, the impact force ("$I_F$") causes the module 60 to be crushed to a crushed length ("$L_3$"). The presence of the spacer layer 66 provides effective voids into which the structural sheet 68 can deform, as shown in FIG. 8.

In a further exemplary embodiment for use of energy absorbing modules constructed in accordance with the present invention, one or more modules are used as a crushable insert in place of the plastic insert described as component 69 in U.S. Pat. No. 5,391,016 which has been incorporated herein by reference. Applicant has found that the use of modules constructed in accordance with the present invention results in much more consistent crush resistance during the duration of the crash event. In this embodiment, currently preferred dimensions for the module are from 12" to 48" in length ("l") and from 4" to 8" in diameter ("d").

It is noted that a typical module constructed in accordance with the present invention will provide crush resistance along 70–75% of its length. The crush resistance ranges from 4,000 to 30,000 pounds or more. The resistance provided by a module can be adjusted by altering the thickness of the sheet metal, the type of metal and/or the distance between the winds or folds.

While preferred embodiments of the invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. An energy-absorbent module comprising:
   a. a generally cylindrical structural member having two axial ends;
   b. one of the two axial ends having an axially precrushed portion.

2. The module of claim 1 wherein the structural member is formed from a structural sheet which has been wound into a cylinder.

3. The module of claim 2 further comprising a spacer layer disposed between winds of the structural sheet.

4. The module of claim 3 wherein the spacer layer comprises polyethylene foam.

5. The module of claim 2 further comprising a binder securing the module into a generally cylindrical shape.

6. An energy-absorbant module formed by rolling a structural sheet and a spacer layer into a generally cylindrical form, the module having a precrushed end creating an initial weakness in the module at a predetermined position.

7. The module of claim 6 having a length from 12 to 48 inches.

8. The module of claim 6 having diameter from 4 to 20 inches.

9. A method of forming an energy-absorbent module comprising:
   a. overlaying a layer of spacer material upon a sheet of structural material;
   b. winding the layer of spacer material and the sheet of structural material into a generally cylindrical module;
   c. using a crimper to crimp portions of an axial end of the module;
   d. precrushing a portion of the end of the module by applying a crushing force to the axial end of the module.

10. The method of claim 9 further comprising securing the module into a cylindrical shape with a binder.

11. The method of claim 9 further comprising applying an adhesive bond to at least one end of the module to secure the module in a spiral cross-section.

12. A crushable member comprising:
   a. a generally cylindrical barrel having a longitudinal axis;
   b. a crushable insert disposed within the barrel, the insert presenting a resistance to axial crushing of the barrel along its longitudinal axis;
   c. the crushable insert having a precrushed axial end portion that presents an initial weakness in the insert to facilitate crushing.

13. The crushable member of claim 12 wherein the insert presents a spiral cross-section.

14. The crushable member of claim 13 further comprising a binder to assist in securing the module in a generally cylindrical shape.

15. The crushable member of claim 14 wherein the binder comprises a wire.

* * * * *